(12) United States Patent
Mori et al.

(10) Patent No.: US 9,086,121 B2
(45) Date of Patent: Jul. 21, 2015

(54) CHAIN GUIDE

(71) Applicant: TSUBAKIMOTO CHAIN CO., Osaka-shi, Osaka (JP)

(72) Inventors: Kaori Mori, Osaka (JP); Masahiko Konno, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 14/184,091

(22) Filed: Feb. 19, 2014

(65) Prior Publication Data

US 2014/0274514 A1 Sep. 18, 2014

(30) Foreign Application Priority Data

Mar. 12, 2013 (JP) ................................ 2013-049090

(51) Int. Cl.
*F16H 7/08* (2006.01)
*F16H 7/18* (2006.01)

(52) U.S. Cl.
CPC .......... *F16H 7/18* (2013.01); *F16H 2007/0872* (2013.01)

(58) Field of Classification Search
CPC ..... F16H 7/18; F16H 2007/0872; F16H 7/08; F01L 71/02; F01L 1/022
USPC .................................................. 474/111, 140
See application file for complete search history.

(56) References Cited

U.S. PATENT DOCUMENTS

| 4,826,468 | A  | * | 5/1989  | Friedrichs ....................... 474/101 |
| 4,832,664 | A  | * | 5/1989  | Groger et al. .................. 474/111 |
| 6,036,613 | A  | * | 3/2000  | Diehm .......................... 474/111 |
| 6,412,464 | B1 | * | 7/2002  | Schneider et al. .......... 123/90.31 |
| 6,832,966 | B2 | * | 12/2004 | Kawano et al. ................ 474/111 |
| 6,955,622 | B2 | * | 10/2005 | Bachmair ....................... 474/130 |
| 6,988,971 | B2 | * | 1/2006  | Konno ............................ 474/111 |
| 7,329,196 | B2 | * | 2/2008  | Konno et al. ................... 474/111 |
| 7,967,708 | B2 | * | 6/2011  | Hayami et al. ................. 474/111 |
| 8,747,263 | B2 | * | 6/2014  | Konno et al. ................... 474/111 |
| 8,900,079 | B2 | * | 12/2014 | Mori et al. ..................... 474/140 |
| 2002/0077204 | A1 | * | 6/2002  | Kumakura ..................... 474/140 |
| 2002/0132688 | A1 | * | 9/2002  | Ono ............................... 474/111 |
| 2002/0193192 | A1 | * | 12/2002 | Inoue et al. .................... 474/111 |
| 2003/0078121 | A1 | * | 4/2003  | Kawano et al. ................ 474/111 |
| 2003/0078122 | A1 | * | 4/2003  | Kawano et al. ................ 474/111 |
| 2003/0139238 | A1 | * | 7/2003  | Konno et al. ................... 474/111 |
| 2003/0144099 | A1 | * | 7/2003  | Horie et al. .................... 474/111 |

(Continued)

FOREIGN PATENT DOCUMENTS

JP 2001-153199 A 6/2001
WO 2007/009587 A1 1/2007

*Primary Examiner* — Henry Liu
(74) *Attorney, Agent, or Firm* — Westerman, Hattori, Daniels & Adrian, LLP

(57) ABSTRACT

A chain guide is provided in which durability is increased, weight can be reduced, material cost is reduced, the uniformity of resin orientation is improved, dimensional errors, errors in shape, internal strains, and defects are reduced, and bending rigidity such as rigidity against deflection and torsion is augmented with a simple configuration. The chain guide is provided with reinforcing ribs at a guide main body. The reinforcing ribs include first inclined reinforcing ribs and second inclined reinforcing ribs that cross each other. A zone in which the reinforcing ribs are not present is provided in the intermediate portion between two support porting.

6 Claims, 4 Drawing Sheets

(56) References Cited

U.S. PATENT DOCUMENTS

| | | | |
|---|---|---|---|
| 2003/0144100 A1* | 7/2003 | Konno | 474/111 |
| 2004/0005952 A1* | 1/2004 | Bachmair | 474/111 |
| 2004/0058761 A1* | 3/2004 | Konno | 474/111 |
| 2004/0058762 A1* | 3/2004 | Konno | 474/111 |
| 2004/0058763 A1* | 3/2004 | Konno | 474/111 |
| 2004/0147350 A1* | 7/2004 | Kurohata et al. | 474/111 |
| 2005/0107196 A1* | 5/2005 | Konno et al. | 474/111 |
| 2005/0227800 A1* | 10/2005 | Shum | 474/140 |
| 2005/0277506 A1* | 12/2005 | Konno | 474/111 |
| 2006/0199689 A1* | 9/2006 | Yoshimoto et al. | 474/111 |
| 2007/0155555 A1* | 7/2007 | Fukata et al. | 474/111 |
| 2008/0032836 A1* | 2/2008 | Konno et al. | 474/140 |
| 2008/0113837 A1* | 5/2008 | Ketterl et al. | 474/140 |
| 2008/0153643 A1* | 6/2008 | Franke et al. | 474/111 |
| 2008/0242460 A1* | 10/2008 | Hewitt et al. | 474/111 |
| 2009/0029814 A1* | 1/2009 | Schuseil | 474/111 |
| 2010/0022338 A1* | 1/2010 | Botez et al. | 474/111 |
| 2010/0248876 A1* | 9/2010 | Kroon et al. | 474/111 |
| 2010/0267504 A1* | 10/2010 | Miyazawa et al. | 474/140 |
| 2010/0292037 A1* | 11/2010 | Botez et al. | 474/111 |
| 2011/0039647 A1* | 2/2011 | He | 474/111 |
| 2011/0105259 A1* | 5/2011 | Fuhrmann | 474/111 |
| 2012/0052997 A1* | 3/2012 | Young | 474/111 |
| 2013/0035184 A1* | 2/2013 | Konno et al. | 474/111 |
| 2013/0059688 A1* | 3/2013 | Konno et al. | 474/140 |
| 2013/0210566 A1* | 8/2013 | Konno | 474/111 |
| 2014/0057749 A1* | 2/2014 | Konno et al. | 474/111 |
| 2014/0087903 A1* | 3/2014 | Maeda | 474/111 |

* cited by examiner

Related Art

Related Art

CHAIN GUIDE

BACKGROUND OF THE INVENTION

1. Field of the Invention

The present invention relates to a chain guide including a guide shoe that slidingly guides a running chain and a guide main body that supports the guide shoe in a chain running direction, this chain guide having a reinforcing rib extending in a height direction of the guide main body.

2. Description of the Related Art

A chain guide provided with a guide shoe that slidingly guides a running chain is commonly used for stabilizing the chain that runs between sprockets and maintaining the correct chain tension. A chain guide is known that is provided with a guide main body supporting the guide shoe along the chain running direction and has a reinforcing rib extending in the height direction of the guide main body (see Japanese Patent Application Publication No. 2001-153199).

For example, FIG. 5 shows a well-known timing system of an engine in which a transmission chain CH such as an endless suspended roller chain is caused to run between sprockets S1, S2 provided at a crankshaft and a camshaft, respectively, inside an engine room E. The timing chain CH is endless suspended between the drive sprocket S1 mounted on the crankshaft inside the engine room E and a pair of driven sprockets S2 mounted on the camshaft, and the timing chain CH is guided by a swinging chain guide (swinging guide) 500 and a chain guide (fixed guide) 600.

In such a well-known timing system, the fixed guide 600 is fixed inside the engine room E by two mounting shafts Q, and the swinging guide 500 is mounted inside the engine room E such as to be capable of swinging in the suspension plane of the timing chain CH about the swinging shaft P as a center.

A chain tensioner T maintains the appropriate tension of the timing chain CH and inhibits vibrations by applying pressure to the swinging guide 500.

As shown in FIGS. 6 and 7, the well-known chain guide (swinging guide) 500 used in such a timing system includes a guide shoe 510 and a guide main body 520. The guide main body 520 has a swinging boss portion 523 that is swingably supported through a support wall portion 521 extending to the side opposite that of a sliding guide surface 511 which is a chain running surface, and a pushing portion 524 which is pushed by a tensioner T to the chain side.

Reinforcing ribs 522 extending in the height direction of the guide main body 520 are provided with appropriate spacing, shape, and orientation and increase the rigidity of the guide main body 520.

Lips 512 protruding to the chain side for preventing the chain from slipping off in the width direction are provided at both sides of the sliding guide surface 511 which is the chain running surface of the guide shoe 510.

The chain guide (fixed guide) 600 has a similar structure, except that two fixed boss portions for fixing to two mounting shafts Q are provided instead of the swinging boss portion 523 and the pushing portion 524 of the above-described chain guide (swinging guide) 500.

Further, the chain guide (swinging guide) 500 or the chain guide (fixed guide) 600 in which the guide shoe 510 and the guide main body 520 are integrally formed by injection molding is also well known.

SUMMARY OF THE INVENTION

When such a well-known chain guide is mounted inside the engine room E, as in the example shown in FIG. 5, the installation space thereof is restricted, hence a more rigid and durable chain guide of a smaller size has to be developed.

For this purpose, it is necessary to increase the thickness of the support wall portion or reinforcing ribs of the guide main body or increase the number of the reinforcing ribs. However, the problems associated with such measures are that the weight is difficult to reduce and the material cost rises.

Further, when the guide main body is formed by injection molding, the reinforcing ribs impede the smooth flow of resin inside the mold, and where the thickness of the reinforcing ribs is enlarged and the number thereof is increased, the orientation of the resin becomes uneven and dimensional errors, errors in shape, internal strains, and defects can occur.

A configuration is known in which in order to alleviate such problems, reinforcing ribs are provided so as to extend at a large angle from the vicinity of an intermediate point in the longitudinal direction of the guide main body, which is the center of the pushing force from the chain, towards two support points where the force is received, and ensure the reinforcement with the reinforcing ribs only in the direction in which the force is mainly applied (see WO 2007/009587A).

However, since the pushing force from the chain is received in two support points, a force bending the guide main body is generated, and where the reinforcing ribs are provided as described hereinabove, the bending stresses are concentrated in the vicinity of the intermediate point in the longitudinal direction. The resultant problem is that cyclic deformations occur in a concentrated manner in the vicinity of the intermediate point in the longitudinal direction due to such stresses, thereby inhibiting the increase in durability.

Further, since the reinforcing ribs are inclined at a large angle, the following problems remained unsolved: the uniform flow of resin inside the mold is impeded, the orientation of the resin becomes uneven, and dimensional errors, errors in shape, internal strains, and defects occur.

A problem arose because the reinforcing ribs are inclined at a large angle only in one direction is that bending rigidity such as rigidity against deflection and torsion is degraded.

It is an object of the present invention to resolve the above-described problems and provide a chain guide in which durability is increased, weight can be reduced, material cost is reduced, the uniformity of resin orientation is improved, dimensional errors, errors in shape, internal strains, and defects are reduced, and bending rigidity such as rigidity against deflection and torsion is augmented with a simple configuration.

The above-described problems are resolved with a chain guide in accordance with the present invention including a guide shoe that slidingly guides a running chain and a guide main body that supports the guide shoe along the chain running direction, and further including reinforcing ribs extending in a height direction of the guide main body, wherein the guide main body has two support points at a predetermined distance L from each other in a longitudinal direction that are constituted by a mounting portion or a pushing portion; the reinforcing ribs are provided in the vicinity of the two support points, and a zone in which the reinforcing ribs are not present is provided in an intermediate portion between the two support points; the reinforcing ribs include first inclined reinforcing ribs that extend obliquely to withdraw from a sliding guide surface of the guide shoe in a direction from a longitudinally central side of the guide main body towards both end sides, and second inclined reinforcing ribs that extend obliquely to approach the sliding guide surface of the guide shoe in the direction from the longitudinally central side of the guide main body towards both end sides; and the first inclined reinforcing ribs and the second inclined reinforcing ribs are provided so as to cross each other.

With the chain guide according to claim 1, since the reinforcing ribs are provided in the vicinity of two support points and a zone in which the reinforcing ribs are not present is provided in the intermediate portion between the two support ports, sufficient reinforcement can be provided by the reinforcing ribs in the vicinity of the two support portions where a high strength is particularly needed, durability can be increased, and bending rigidity such as rigidity against deflection and torsion can be augmented.

Further, by increasing the size of the portion without the reinforcing ribs, it is possible to reduce the size of the portion where the resin flow is disturbed inside the mold in the production process. Therefore, the uniformity of resin orientation is improved, and dimensional errors, errors in shape, internal strains, and defects are reduced.

Since the first inclined reinforcing ribs ensure sufficient reinforcement from the vicinity of the intermediate point in the longitudinal direction of the guide main body, which is the direction in which a force is mainly applied, toward two points the force is applied and the first inclined reinforcing ribs and second inclined reinforcing ribs are provided such as to cross each other, the resin flow inside the mold in the production process is made uniform, without a displacement in the height direction, the uniformity of internal resin orientation is improved, and dimensional errors, errors in shape, internal strains, and defects are reduced. In addition, bending rigidity such as rigidity against deflection and torsion can be further augmented.

With the configuration according to claim 2, since the crossing position of the first inclined reinforcing ribs and the second inclined reinforcing ribs is in an intermediate H/3 range with respect to the height H of the guide main body at the crossing position, the resin flow in the mold in the manufacturing process can be made even more uniform.

With the configuration according to claim 3, since at least one or more of the first inclined reinforcing ribs and the second inclined reinforcing ribs is formed to extend as a curve, the pushing force is dispersed by the first inclined reinforcing ribs and the second inclined reinforcing ribs and stress concentration is relaxed. Therefore, by optimizing the reinforcing rib shape according to the force received from the chain, it is possible to reduce the volume of the reinforcing ribs as a whole, decrease the weight, and reduce the material cost.

Further, the shape optimum for the resin flow inside the mold in the manufacturing process can be obtained and the flow can be made more uniform.

With the configuration according to claim 4, since all of the first inclined reinforcing ribs and the second inclined reinforcing ribs that are formed to extend as a curve are of a shape having a curvature center on the longitudinally central side of the guide main body, the first inclined reinforcing ribs and the second inclined reinforcing ribs have the curved shape curved in the same direction as the chain running surface. Therefore, the pushing force can be further dispersed and stress concentration can be further relaxed.

Further, since the first inclined reinforcing ribs and the second inclined reinforcing ribs have the curved shape curved in the same direction as the entire guide, the resin flow inside the mold in the manufacturing process is further optimized.

With the configuration according to claim 5, since at least three reinforcing ribs including one or more of the first inclined reinforcing ribs and the second inclined reinforcing ribs are provided, even more optimum reinforcing rib shape can be obtained.

With the configuration according to claim 6, since there is no reinforcing rib in an L/3 zone including an intermediate point between the two support points, bending stresses can be uniformly received in this zone, thereby preventing the concentration of stresses in a narrow range close to the intermediate point between the two support ports, making it possible to increase the durability of the entire chain guide, reducing the total volume of the reinforcing ribs, decreasing the weight, and reducing the material cost.

DESCRIPTION OF THE PREFERRED EMBODIMENTS

The present invention provides a chain guide including a guide shoe that slidingly guides a running chain and a guide main body that supports the guide shoe along the chain running direction, and having reinforcing ribs extending in a height direction of the guide main body, wherein the guide main body has two support points at a predetermined distance L from each other in a longitudinal direction that are constituted by a mounting portion or a pushing portion; the reinforcing ribs are provided in the vicinity of the two support points, and a zone in which the reinforcing ribs are not present is provided in an intermediate portion between the two support points; the reinforcing ribs include first inclined reinforcing ribs that extend obliquely such as to withdraw from a sliding guide surface of the guide shoe in a direction from a longitudinally central side of the guide main body towards both end sides, and second inclined reinforcing ribs that extend obliquely such as to approach the sliding guide surface of the guide shoe in the direction from the longitudinally central side of the guide main body towards both end sides; and the first inclined reinforcing ribs and the second inclined reinforcing ribs are provided so as to cross each other. Such a chain guide may have any specific configuration, provided that durability is increased, weight can be reduced, material cost is reduced, the uniformity of resin orientation is improved, dimensional errors, errors in shape, internal strains, and defects are reduced, and bending rigidity such as rigidity against deflection and torsion is augmented with a simple configuration.

The guide main body and guide shoe may be formed as separate components or may be integrated, and well-known appropriate materials may be selected therefor according to the rigidity, sliding characteristic, moldability, and cost.

Example 1

The chain guide (swinging guide) according to the first embodiment of the present invention will be explained below with reference to the appended drawings.

The chain guide according to the first embodiment of the present invention is swingably supported inside an engine having a timing system, guides and stabilizes the running of a timing chain CH, and maintains an appropriate tension by being pushed by the tensioner T to the chain side. The chain guide is provided with a guide shoe and a guide main body 120.

Figure 1:
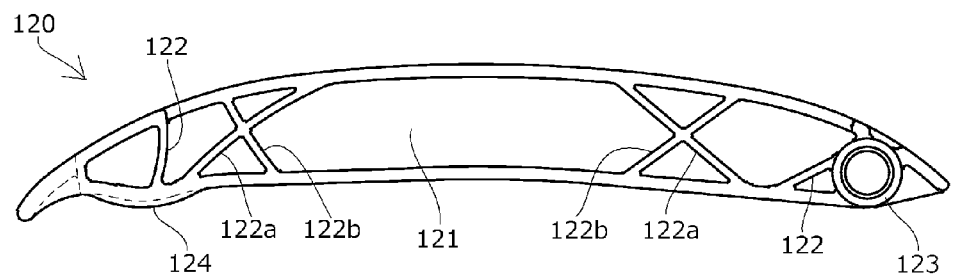
FIG. 1 is a side view of the chain guide (swinging guide) according to the first embodiment of the present invention.

As shown in FIG. 1, similarly to the above-described well-known chain guide (swinging guide) 500, the guide main body 120 of the chain guide according to the first embodiment of the present invention has a swinging boss portion 123 which is a mounting portion swingably supported through a support wall portion 121, and a pushing portion 124 pushed by the tensioner T to the chain side. Reinforcing ribs 122 are provided outside the support wall portion 121 to increase the rigidity and durability of the guide main body 120 (the shape, dimensions, and arrangement of respective constituent members are different from those of the above-described well-known configuration, but are functionally the same).

The guide shoe (not shown in the figure) is fixed above the guide main body 120, but the upper surface of the guide main body 120 may be formed as the sliding guide surface to integrate the functions of the guide shoe.

Figure 2:
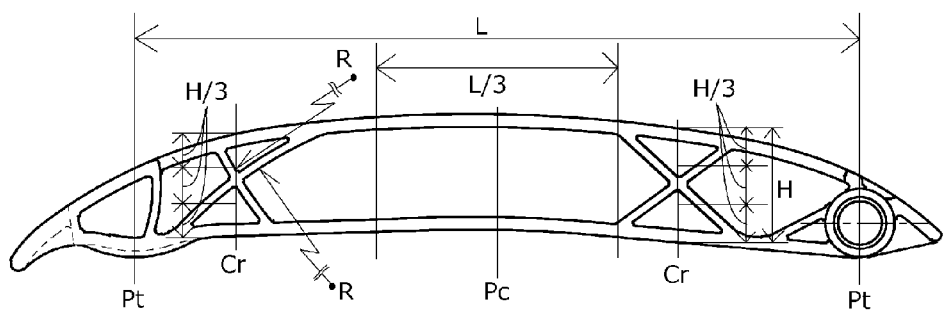
FIG. 2 is an explanatory drawing illustrating the mutual arrangement shown in FIG. 1.

As shown in FIG. 2, the reinforcing ribs 122 are provided only at both sides of an L/3 zone including an intermediate point Pc between two support points Pt located at a predetermined distance L from each other in the longitudinal direction and constituted by the swinging boss portion 123, which is a mounting portion, and the pushing portion 124. No reinforcing ribs are present in the range of the L/3 zone including the intermediate point Pc.

As a result, bending stresses applied to the guide main body 120 can be uniformly received by the zone where the reinforcing ribs 122 are not present, stresses are not concentrated in a narrow range in the vicinity of the intermediate point Pc between the two support points Pt, the durability of the entire chain guide can be increased, the total volume of the reinforcing ribs 122 can be decreased, weight can be decreased, and material cost can be reduced.

Further, in the present embodiment, as shown in FIGS. 1 and 2, first inclined reinforcing ribs 122*a* that extend obliquely such as to withdraw from a sliding guide surface in the direction from a longitudinally central side towards both end sides, and second inclined reinforcing ribs 122*b* that extend obliquely such as to approach the sliding guide surface in the direction from the longitudinally central side of the guide main body towards both end sides are provided at both sides of the guide main body 120, and the first inclined reinforcing ribs 122*a* and the second inclined reinforcing ribs 122*b* are provided to cross each other.

The crossing positions Cr of the first inclined reinforcing ribs 122*a* and the second inclined reinforcing ribs 122*b* are provided in an intermediate H/3 range with respect to a height H of the guide main body 120 at the crossing position Cr.

As a result, when the guide main body 120 is manufactured by injection molding, the flow of resin inside the mold is prevented from shifting in the height direction, the uniformity of resin orientation in the guide main body 120 is improved, dimensional errors, errors in shape, internal strains, and defects can be reduced, durability is increased, and bending rigidity such as rigidity against deflection and torsion is augmented.

Further, in the present embodiment, as shown in FIGS. 1 and 2, the first inclined reinforcing ribs 122*a* and the second inclined reinforcing ribs 122*b* provided at the left end side (as shown in the figure) of the guide main body 120 are formed in a circular-arc curved shape with a curvature center R thereof being positioned on a longitudinally central side of the guide main body 120.

As a result, the pushing force is dispersed and stress concentration is relaxed. Therefore, by providing the optimum reinforcing rib shape corresponding to the force received from the chain, it is possible to decrease the volume of the reinforcing ribs 122 of the entire guide main body 120, decrease the weight, and reduce the material cost.

Since the first inclined reinforcing ribs 122*a* and the second inclined reinforcing ribs 122*b* have a curved shape curved in the same direction as the curved shape of the entire guide main body 120, the effect produced on the flow of resin in the mold in the manufacturing process is small, the uniformity of internal resin orientation is improved, and dimensional errors, errors in shape, internal strains, and defects can be reduced.

Further, the first inclined reinforcing ribs 122*a* and the second inclined reinforcing ribs 122*b* provided at the right end side (as shown in the figure) of the guide main body 120 are linear, but they may be curved, or all of the reinforcing ribs may be linear, or a combination of curved and linear shapes may be used, and the optimum curvature radius may be selected by using an optimum combination according to the shape of the entire guide main body 120 or the state of the pressure to be applied.

Example 2

Figure 3:
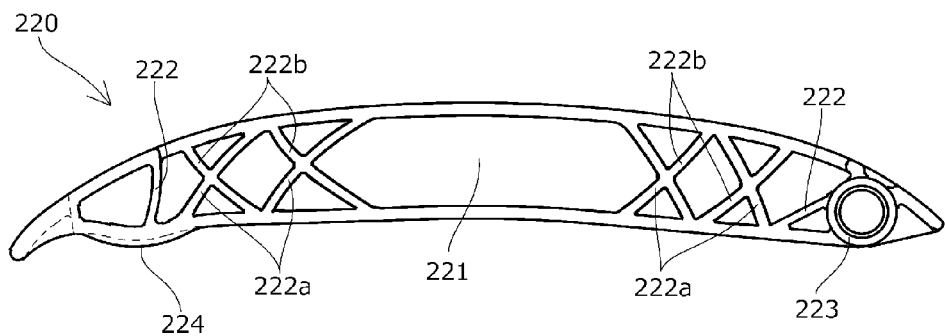
FIG. 3 is a side view of the chain guide (swinging guide) according to the second embodiment of the present invention.

In a guide main body 220 of the chain guide (swinging guide) according to the second embodiment of the present invention, two sets of intersecting first inclined reinforcing ribs 222*a* and second inclined reinforcing ribs 222*b* are provided at each end side of the guide main body 220, as shown in FIG. 3. Other features are the same as in the first embodiment.

With such a configuration, the vicinity of a swinging boss portion 223 and a pushing portion 224 where a pushing force is directly applied, those portions being the two support points of the guide main body 220, can be further reinforced.

Example 3

Figure 4:
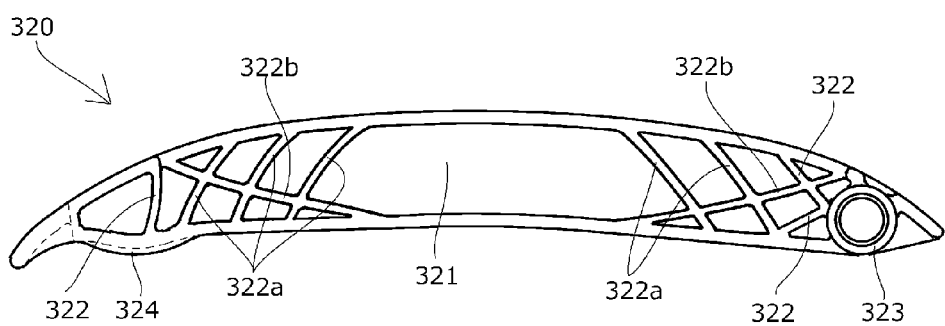
FIG. 4 is a side view of the chain guide (swinging guide) according to the third embodiment of the present invention.
Figure 5:
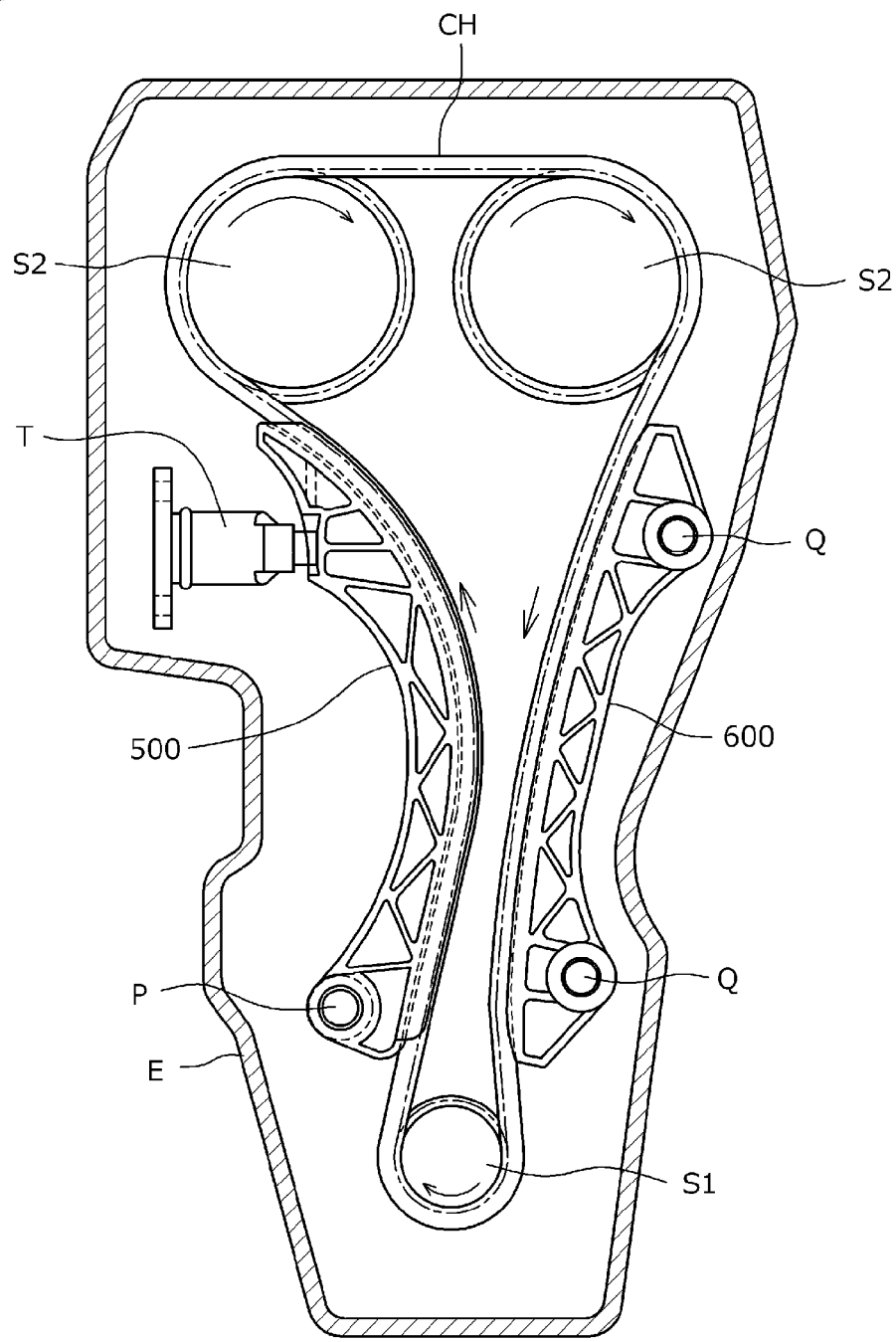
FIG. 5 is an explanatory drawing illustrating the conventional timing system for an engine.
Figure 6:
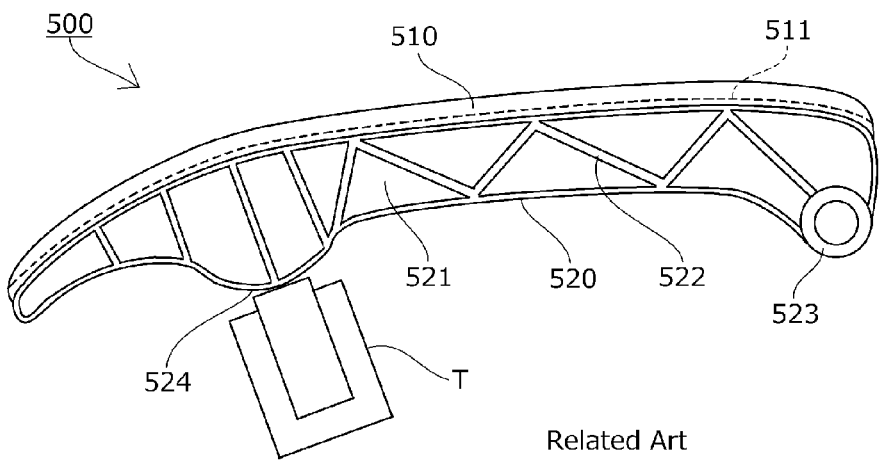
FIG. 6 is a side view illustrating the conventional chain guide (swinging guide)
Figure 7:
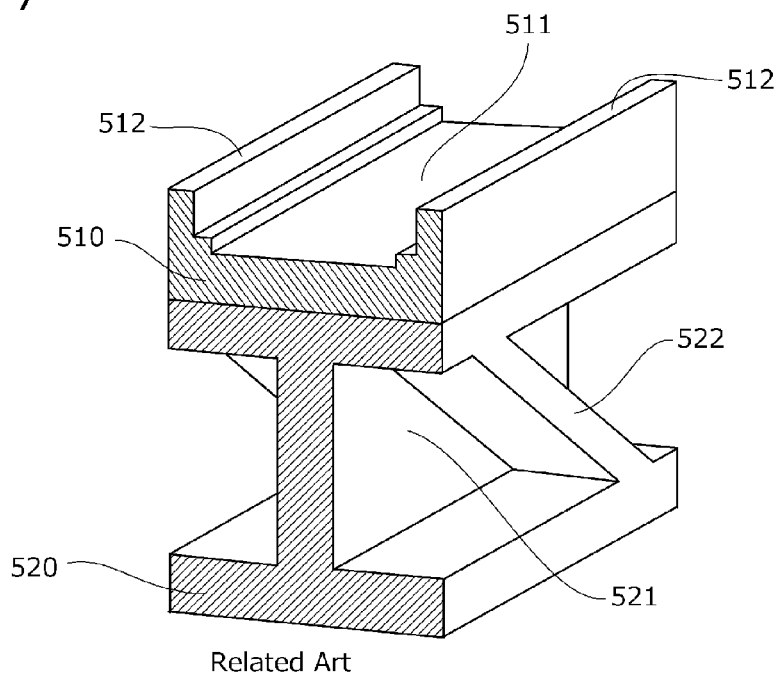
FIG. 7 is a schematic cross-sectional perspective view of the conventional chain guide.

In a guide main body 320 of the chain guide (swinging guide) according to the third embodiment of the present invention, one second inclined reinforcing rib 322*b* and a plurality of first inclined reinforcing ribs 322*a* are provided at each end side of the guide main body 320 and all of the plurality of first inclined reinforcing ribs 322*a* cross the second inclined reinforcing rib 322*b*, as shown in FIG. 4.

Further, another reinforcing rib 322 on the swinging boss portion 323 side also crosses the second inclined reinforcing rib 322*b*. Other features are the same as in the first embodiment.

As a result, the vicinity of a swinging boss portion 323 and a pushing portion 324 where a pushing force is directly applied, those portions being the two support points of the guide main body 320, can be further reinforced. Further, by designing, as appropriate, the number of the first inclined reinforcing ribs 322*a* according to the distribution of a load from the chain, it is possible to reduce the effect produced on the flow of resin inside the mold as much as possible in the manufacturing process.

The above-described embodiments are specific examples of the chain guide in accordance with the present invention, but the chain guide in accordance with the present invention is not limited thereto, and the shapes, positions, dimensions, and mutual arrangement of constituent members can be changed variously.

For example, in the embodiments, a mode is described in which the chain guide is used as a swinging guide, but it may be also used as a fixed guide.

The inclination angles, number, curvature, and crossing state of the reinforcing ribs may be determined at random. Further, both end portions in the embodiments have the same shape, but they may have different shapes, and may also have shapes other than those in the above-described embodiments.

Further, the configurations of the above-described embodiments are to be provided inside an engine having a timing system, but such an application is not limiting and they can be used in various devices.

Furthermore, the present invention can be applied not only to chain-based transmission mechanisms, but also to similar transmission mechanism using belts, ropes, and the like, and can be used in various industrial fields.

What is claimed is:

1. A chain guide comprising: a guide shoe that slidingly guides a running chain; and a guide main body that supports the guide shoe along the chain running direction, and further comprising reinforcing ribs extending in a height direction of the guide main body,
   the guide main body having two support points at a predetermined distance L from each other in a longitudinal direction that are constituted by a mounting portion or a pushing portion;
   the reinforcing ribs being provided in the vicinity of the two support points, and a zone in which the reinforcing ribs are not present is provided in an intermediate portion between the two support points;
   the reinforcing ribs including first inclined reinforcing ribs that extend obliquely to withdraw from a sliding guide surface of the guide shoe in a direction from a longitudinally central side of the guide main body towards both end sides, and second inclined reinforcing ribs that extend obliquely to approach the sliding guide surface of the guide shoe in the direction from the longitudinally central side of the guide main body towards both end sides; and
   the first inclined reinforcing ribs and the second inclined reinforcing ribs are provided so as to cross each other.

2. The chain guide according to claim 1, wherein a crossing position of the first inclined reinforcing ribs and the second inclined reinforcing ribs is in an intermediate H/3 range with respect to a height H of the guide main body at the crossing position Cr.

3. The chain guide according to claim 1, wherein at least one or more of the first inclined reinforcing ribs and the second inclined reinforcing ribs is formed to extend as a curve.

4. The chain guide according to claim 3, wherein all of the first inclined reinforcing ribs and the second inclined reinforcing ribs that are formed to extend as a curve are of a shape having a curvature center on the longitudinally central side of the guide main body.

5. The chain guide according to claim 1, wherein the reinforcing ribs include one or more of the first inclined reinforcing ribs and the second inclined reinforcing ribs, and at least three reinforcing ribs including one or more of the first inclined reinforcing ribs and the second inclined reinforcing ribs are provided at either one or both longitudinally end sides of the guide main body.

6. The chain guide according to claim 1, wherein the zone in which the reinforcing ribs are not present is an L/3 zone including an intermediate point between the two support points.

* * * * *